US00RE35022E

United States Patent [19]

Foster

[11] E Patent Number: Re. 35,022

[45] Reissued Date of Patent: Aug. 22, 1995

[54] REDUCED SIZE DRIVE/FRAME ASSEMBLY FOR A RECIPROCATING FLOOR CONVEYOR

[76] Inventor: Raymond K. Foster, P.O. Box 1, Madras, Oreg. 97741

[21] Appl. No.: 321,751

[22] Filed: Oct. 12, 1994

Related U.S. Patent Documents

Reissue of:

[64] Patent No.: 4,793,469
Issued: Dec. 27, 1988
Appl. No.: 42,328
Filed: Apr. 24, 1987

U.S. Applications:

[62] Division of Ser. No. 477,767, Mar. 22, 1983, abandoned.

[51] Int. Cl.[6] ..... B65G 25/04

[52] U.S. Cl. ..... 198/750.5; 198/775; 414/325.9

[58] Field of Search ..... 198/750, 773–775; 414/525.1

[56] References Cited

U.S. PATENT DOCUMENTS

| | | | |
|---|---|---|---|
| 1,977,696 | 10/1934 | Purdy | 198/218 |
| 2,550,925 | 5/1951 | Weimer | 309/4 |
| 2,629,504 | 2/1953 | Peterson | 214/83.3 |
| 2,973,856 | 3/1961 | Brooks | 198/219 |
| 3,525,446 | 8/1970 | Grafstrom | 414/525 |
| 3,534,875 | 10/1970 | Hallstrom, Jr. | 198/750 |
| 3,772,966 | 11/1973 | Mills | 92/66 |
| 3,905,290 | 9/1975 | Caughey | 100/215 |
| 4,143,760 | 3/1979 | Hallstrom | 198/750 |
| 4,144,963 | 3/1979 | Hallstrom | 198/750 |
| 4,184,587 | 1/1980 | Hallstrom | 198/750 |
| 4,456,077 | 6/1984 | Lagerstedt et al. | 173/147 |
| 4,474,285 | 10/1984 | Foster | 198/750 |
| 4,492,303 | 1/1985 | Foster | 198/750 |

FOREIGN PATENT DOCUMENTS

| | | | |
|---|---|---|---|
| 984776 | 7/1951 | France | 8/1 |
| 1296087 | 5/1969 | Germany . | |
| 6706657 | 11/1968 | Netherlands | 81/12 |

*Primary Examiner*—D. Glenn Dayoan
*Attorney, Agent, or Firm*—David P. Campbell; Delbert J. Barnard

[57] ABSTRACT

Piston rod portions (83, 85, 87) of three linear hydraulic motors (10, 12, 14) are connected at their opposite ends of two spaced apart transverse frame members (88, 90). A cylinder (120) is driven back and forth along each piston rod (83, 85, 87). Three transverse drive beams (16, 18, 20) are provided. Each drive beam (16, 18, 20) is directly connected to an associated one of the cylinders (120). Three set of floor slat members (1, 2, 3) are provided. Each set (1, 2, 3) is connected to an associated one of the transverse drive beams (16, 18, 20). The linear hydraulic motors (10, 12, 14) are operated for moving the floor slat members in one direction, for advancing a load, and for retracting them in the opposite direction.

36 Claims, 7 Drawing Sheets

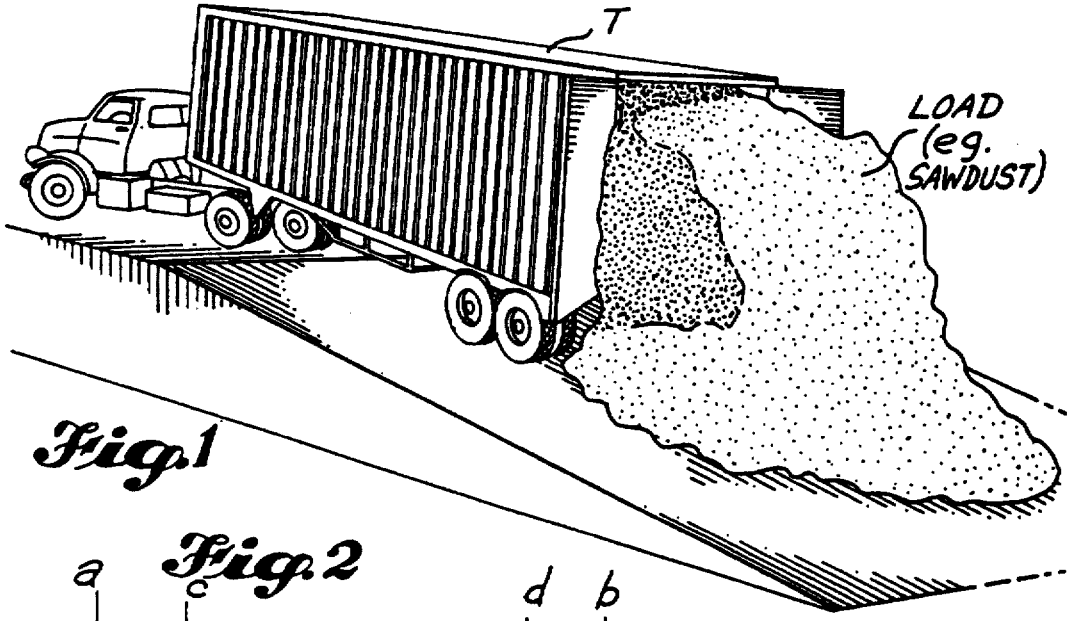
Fig. 1
Fig. 2
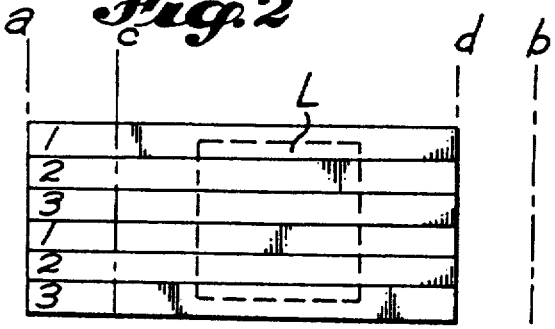
Fig. 3
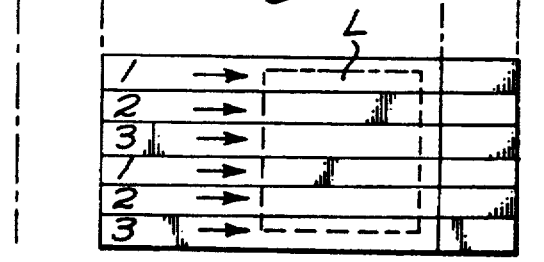
Fig. 4
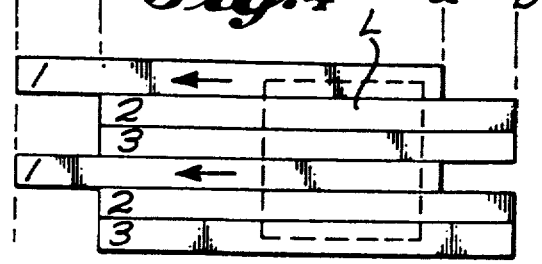

REDUCED SIZE DRIVE/FRAME ASSEMBLY FOR A RECIPROCATING FLOOR CONVEYOR

Matter enclosed in heavy brackets [ ] appears in the original patent but forms no part of this reissue specification; matter printed in italics indicates the additions made by reissue.

This application is a division of application Ser. No. 477,767, filed Mar. 22, 1983, now abandoned.

TECHNICAL FIELD

This invention relates to improvements in reciprocating floor conveyors, and in particular to the provision of a compact hydraulic drive and support frame assembly for a reciprocating floor conveyor.

BACKGROUND INFORMATION

Reciprocating floor conveyors are a relatively recent development. Basically, they comprise at least one group of at least three elongated floor members and a hydraulic drive system which operates to drive at least a majority of the floor members in unison in the desired conveying direction, and to retract them individually. Systems are in use in which all of the floor members are driven in unison, in the desired conveying direction, and are then individually retracted sequentially. It has also been proposed to drive a majority of the floor slat members in the desired conveying direction while at the same time retracting the remaining floor slat members. The present invention has application with both types of systems.

For background purposes, reference is made to U.S. Pat. No. 4,143,760, granted Mar. 13, 1979, to U.S. Pat. No. 4,144,963, granted Mar. 20, 1979, and to U.S. Pat. No. 4,184,587, granted Jan. 22, 1980, all to Olaf A. Hallstrom. Reference is also made to my copending application Ser. No. 346,863, filed Feb. 8, 1982, entitled Drive Unit Mount for a Reciprocating Floor Conveyor, and now U.S. Pat. No. 4,474,285, granted Oct. 2, 1984, and to my copending application Ser. No. 346,865, filed Feb. 8, 1982, and entitled Drive/Guide System for a Reciprocating Floor Conveyor, and now U.S. Pat. No. 4,492,303, granted Jan. 8, 1985.

Earlier forms of reciprocating floor conveyors are disclosed by U.S. Pat. No. 2,629,504, granted February of 1953 to Peterson; by U.S. Pat. No. 2,973,856, granted in March of 1961 to Brooks; by U.S. Pat. No. 3,534,875, granted in October of 1970 to Hallstrom; and by West German Patent Publication 1,296,087, published in May of 1969. These patents are not particularly pertinent to the subject invention and require no further comment.

DISCLOSURE OF THE INVENTION

The present invention provides a smaller and lighter weight modular type drive assembly.

The drive assembly of the present invention is basically characterized by a plurality of reversible linear hydraulic drive units, one for each set of floor slat members. Each drive unit comprises an elongated piston rod having two opposite end mounting portions, a piston portion fixed on a mid part of the piston rod, and a cylinder mounted to reciprocate back and forth on the piston rod. When installed, the piston rods are fixed and the cylinders are movable. Each cylinder is connected to its set of the floor slat members.

In preferred form, a transverse drive beam is associated with each cylinder. Each transverse drive beam is connected to its set of floor slat members and is also connected to the moving cylinder of its hydraulic drive unit.

According to an aspect of the invention, the transverse drive beams are detachably connected to the cylinders by means of clamp assemblies.

According to another aspect of the invention, the clamp assemblies and the cylinders include interlocking structure which prevents the cylinders from moving endwise relative to the transverse drive beams.

According to a further aspect of the invention, the drive assembly includes a pair of transverse frame members associated with the opposite end mounting portions of the elongated piston rods, and means for detachably securing the mounting portions of the piston rods to the transverse frame members.

According to yet another aspect of the invention, at least two longitudinal frame members are interconnected between the transverse frame members, outwardly on opposite sides of the plurality of drive units.

In accordance with another aspect of the invention, the longitudinal frame members include bearing means which make contact with the transverse drive beams.

Other more detailed features of the invention are described in the description of the preferred embodiment and are particularly pointed out in the appended claims.

BRIEF DESCRIPTION OF THE DRAWINGS

In the drawings, like element designations refer to like parts throughout, and

FIG. 1 is a pictorial view of a truck that is equipped with a reciprocating floor conveyor constructed in accordance with the present invention, shown in the process of using the conveyor to discharge its load;

FIG. 2 is a top plan diagram of a conveyor which includes three floor members per group with each common floor member being identified by a common number, such conveyor being shown in a fully retracted position;

FIG. 3 is a view like FIG. 2, but showing all of the floor members being advanced in unison to convey a load in the direction indicated by arrows;

FIG. 4 is a view like FIGS. 2 and 3, showing floor members 2 and 3 stationary while floor members 1 are being retracted;

BEST MODE FOR CARRYING OUT THE INVENTION

FIG. 1 shows a load of sawdust or other bulk material being unloaded from a large truck T by use of a reciprocating floor conveyor within the truck T.

FIGS. 1-6 illustrate how the reciprocating floor conveyor works. These figures show two groups of floor members. Each group comprises three independent floor members designated 1, 2 and 3. The members "1" move together. The members "2" move together. And, the members "3" move together.

Figure 5:
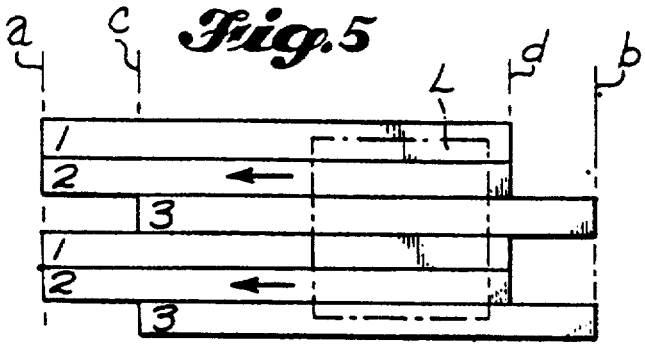
FIG. 5 is a view like FIGS. 2–4, but showing floor members 1 and 3 stationary while floor members 2 are being retracted.
Figure 6:
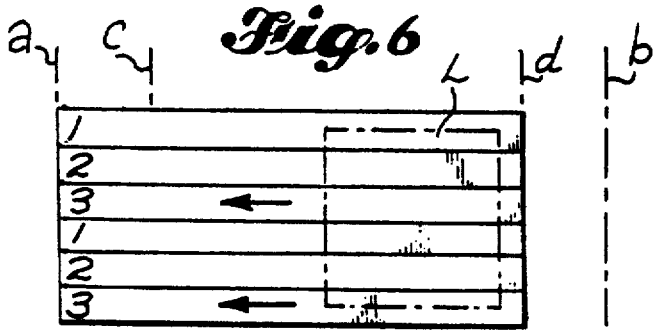
FIG. 6 is a view like FIGS. 2–5, but showing floor members 1 and 2 stationary and floor members 3 being retracted.

FIG. 2 shows all of the floor members in a retracted position in which common ends are aligned at a start station a. A load L is shown centrally positioned on the floor. FIG. 3 shows all of the floor members being advanced together to move the load L forwardly and the opposite ends of the floor members to a fully advanced position b. FIG. 4 shows the group "1" floor members being retracted and the groups "2" and "3" floor members held stationary. The load does not move because the frictional forces exerted on it by the stationary floor members are larger than the frictional forces exerted on it by the retracting floor members "1". FIG. 5 shows the next step in the sequence. The retracted floor members "1" and the still advanced floor members "3" are held stationary and the floor members "2" are retracted. Again, the load L does not move. FIG. 6 shows retracted floor members "1" and "2" stationary and floor members "3" being retracted. Again, the load L does not move. In this example, the load L has moved a distance equal to the endwise movement of the floor, viz. a-c or d-b.

Figures 13, 14, 15, 16, 17:
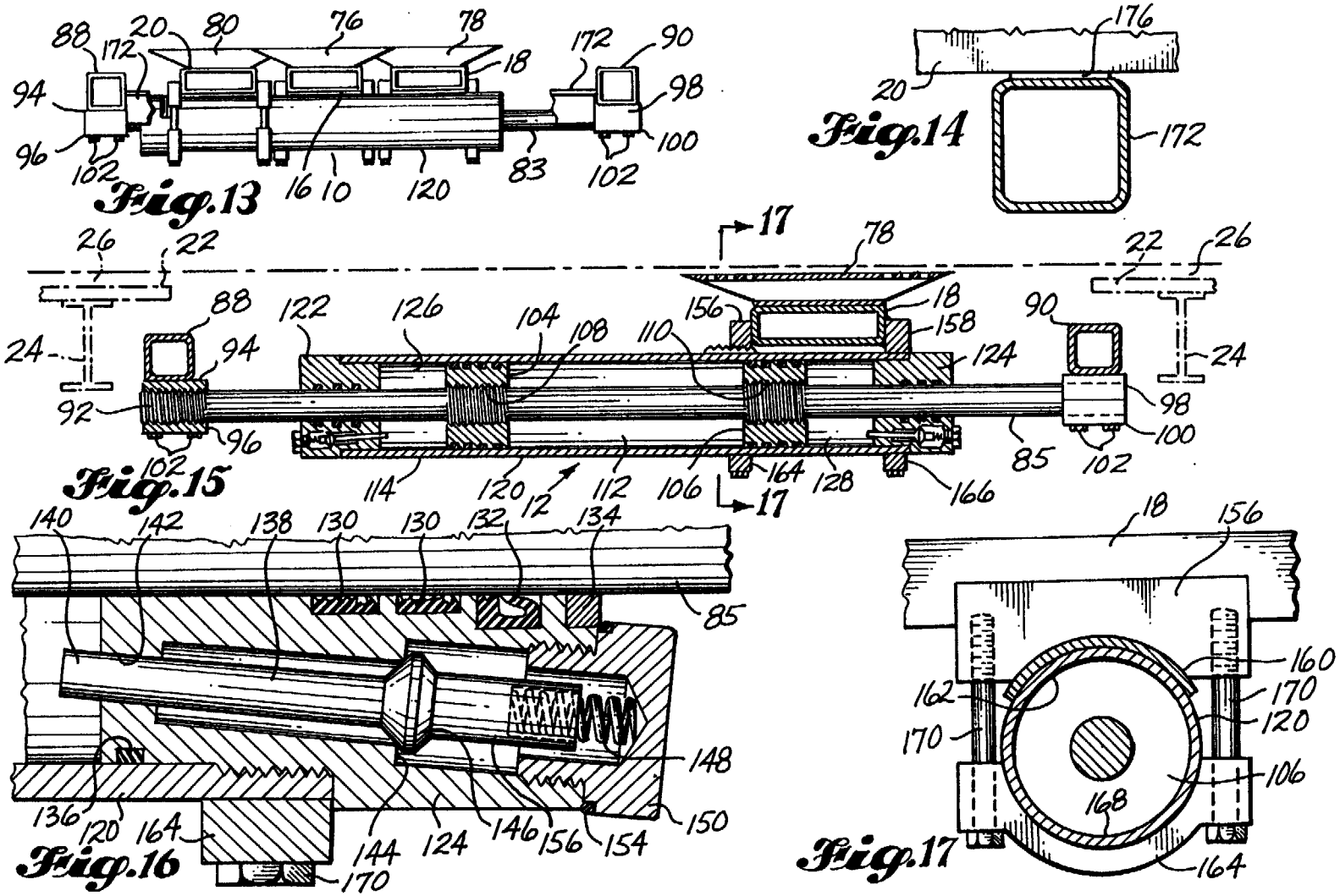
FIG. 13 is an end elevational view of the drive assembly shown in FIGS. 11 and 12, with a mid portion of a foreground side beam removed for clarity of illustration of the components behind such beam.
FIG. 14 is a fragmentary sectional view taken substantially along the line 14—14 of FIG. 11, showing a portion of one of the transverse drive beams resting on a bearing strip which is secured to the top of the side beam.
FIG. 15 is a longitudinal sectional view taken through one of the hydraulic drive units, substantially along line 15—15 of FIG. 11.
FIG. 16 is an enlarged scale fragmentary view of the valve region which is shown within a circle in FIG. 15.
FIG. 17 is a fragmentary sectional view taken substantially along line 17—17 of FIG. 15, showing one of the clamp mechanisms used for securing the transverse drive beam to the cylinder.

Referring now to FIGS. 11-17, the drive mechanism which is illustrated is adapted to be installed within a space provided for it within a main support frame of a vehicle or a stationary installation. The drive mechanism comprises three hydraulic drive units 10, 12, 14. The drive units 10, 12, 14, function to reciprocate a like number of transverse drive beams 16, 18, 20. As best shown by FIG. 15, when the drive mechanism is installed, the transverse drive beams 16, 18, 20 are positioned to reciprocate within a space defined at its ends by the ends of two axially aligned groups of guide beams 22. In this respect, the relationship of the drive mechanism is essentially the same as what is shown in the aforementioned U.S. Pat. No. 4,184,587, and the aforementioned U.S. Pat. No. 4,492,303. However, the unique construction of the drive mechanism of the present invention enables the drive mechanism to be installed in a much shorter axial space.

Figure 9:
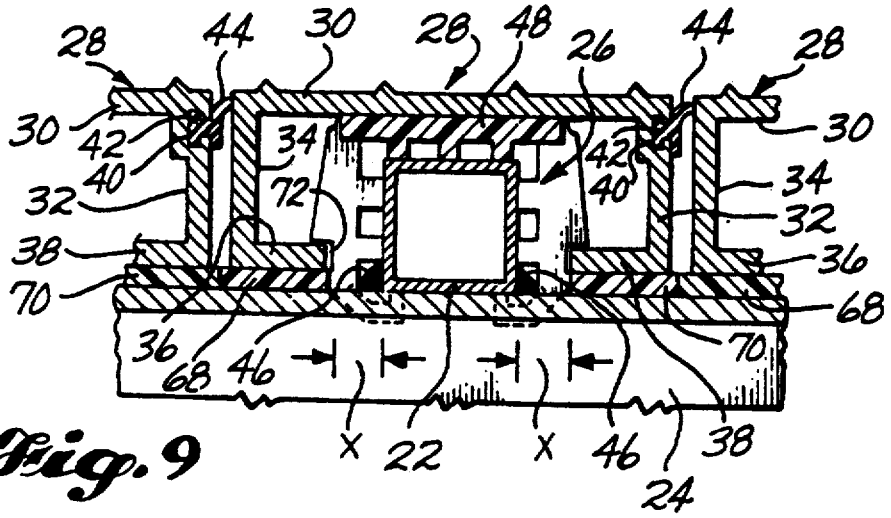
FIG. 9 is a cross-sectional view taken substantially along line 9—9 of FIG. 7.

The main support frame for the installation comprises a plurality of transverse support beams. Two of these beams are shown in FIG. 15 and are designated 24. A complete illustration of the support frame is shown in the aforementioned U.S. Pat. No. 4,492,305. The guide beams 22 extend across upper surface portions of the transverse support beam 24. The guide beams 22 are connected to the support beam 24 by fillet welds on each side of the guide beams 22 (FIG. 9).

A plurality of connectors 82 are connected to and move with the transverse drive beam 16. A plurality of connectors 84 are connected to and move with the transverse drive beam 18. A plurality of connectors 86 are connected to and move with the drive beam 20. By way of example, the group "1" floor members may be connected to the connectors 82. The group "2" floor members may be connected to the connectors 84. The group "3" floor members may be connected to the connectors 86. Preferably, the connectors 82, 84, 86 are welded to the transverse drive beams 16, 18, 20. The floor members "1", "2", "3" are secured to the connectors 82, 84, 86 by means of bolts or other suitable fasteners which extend through openings in the floor members and connectors.

Aside from their connection to the connectors 16, 18, 20, the floor members "1", "2" and "3" are free to move. The guide beams 22 are provided to guide their movement and plastic slide bearings 26 are provided to facilitate movement.

Throughout the several figures of the drawings, some of the floor members are designated 28. Some of the guide beams are designated 22. Some of the transverse support beams are designated 24. Some of the bearings are designated 26. Also, in FIG. 15, two of the locations of the plastic slide bearings are shown and are designated 26. It is to be understood that a plastic slide bearing is to be provided at each location where a longitudinal guide beam 22 crosses and is connected to a transverse support beam 24.

Referring to FIG. 9, each floor member 28 comprises a top panel 30, a pair of side panels 32, 34 which depend from the top panel 30 and a pair of inwardly directed bottom flanges 36, 38. A T-shaped groove is formed in the upper portion of each side panel 32 to receive the T-shaped locking portion 42 of a seal strip 44. A lip portion of the seal strip 44 makes contact with an upper outer side portion of the side panel 34 of the adjoining floor member 28.

Figure 10:
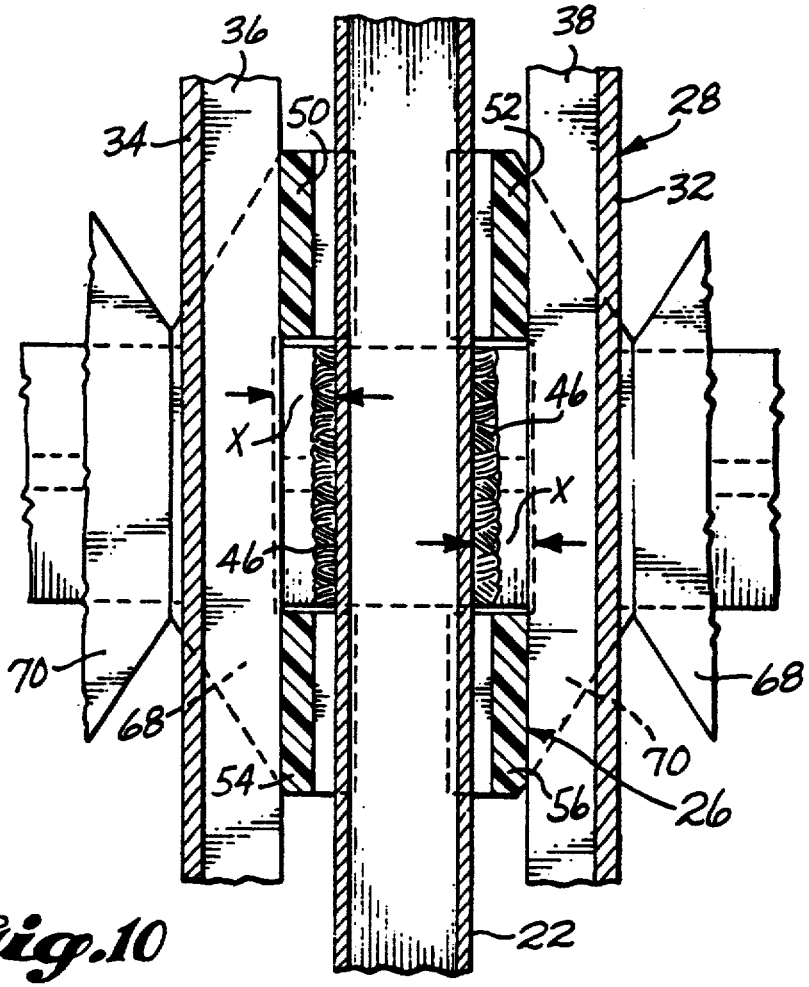
FIG. 10 is a sectional view taken substantially along line 10—10 of FIG. 8, showing components which are below the section line in top plan.

As best shown by FIGS. 9 and 10, the longitudinal guide beams 22 are relatively small in cross section in comparison with the cross section of the floor members 28. This creates no problem because forces are only carried at the location of the slide bearings 26. In a typical installation, thin wall steel tubing, of square cross section, having an outside dimension of about 1"×1" is preferred. Such tubing is used in combination with floor members which measure approximately 3½ in width. An important factor in the installation is that the dimensions "x" are substantially large, e.g. about ⅜ of an inch. This provides sufficient room on each side of the guide beams 22 for a very substantial, undressed fillet weld 46. This is quite important because a larger weld can be applied faster and with less care than a smaller weld and the strength of the connection is greater. A problem encountered with the use of a large dimension guide tube, such as disclosed in the aforementioned U.S. Pat. No. 4,184,587, was that it greatly limited the room available at the sides of the guide tubes for welding them to the transverse support frame beams. Skillful welding was required and in many cases the weld had to be "dressed". The resulting fillet was relatively small regardless of the quality of the weld and the connections were often weakened by the grinding or other dressing that was necessary.

The use of the small dimension guide tubes 22 and the particular slide bearing configuration 26 that is disclosed therein is what has made it possible for me to use larger, stronger fillet welds between the guide beams 22 and the support beams 24.

Figure 7:
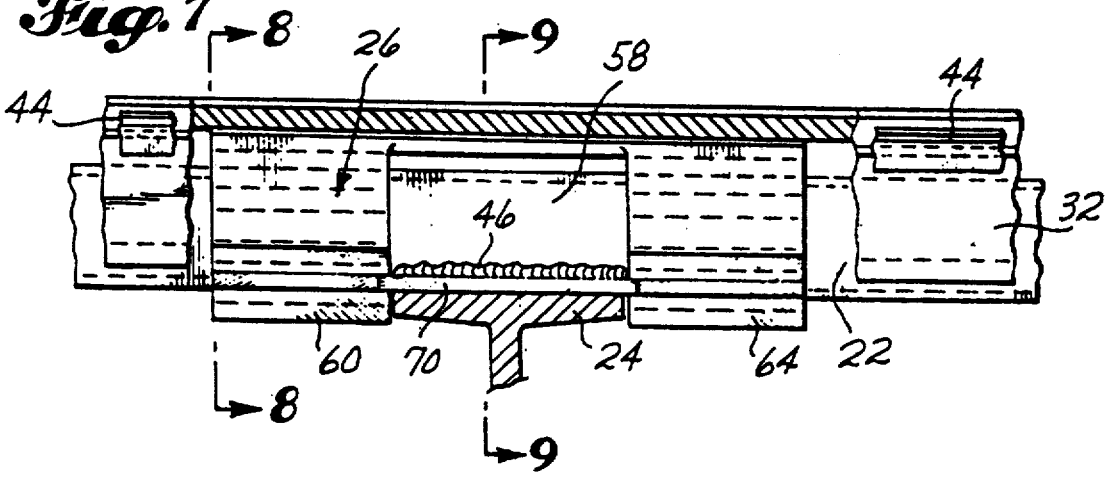
FIG. 7 is an enlarged scale fragmentary view of the region where a floor member guide beam crosses and is attached to a transverse floor support frame member, with a foreground portion of the floor member cut away for the purpose of showing a slide bearing provided at such location in side elevation, and showing a fragmentary portion of the transverse floor support frame member in section.

As best shown in FIGS. 7–10, the plastic slide bearing 26 comprises a continuous top 48 which extends the full length of the bearing 26. Sidewall portions 50, 52, 54, 56 are provided only at the ends of the bearing 26. Sidewall portions 50, 54 are provided on one side of the bearing and are separated by a large dimension opening or window 58 (FIG. 7). A similar central opening or window is provided on the opposite side of the bearing, between sidewall portions 52, 56.

An inwardly directed lock flange 60, 62, 64, 65, 66 extends laterally inwardly from each sidewall portion 50, 52, 54, 56.

Figure 8:
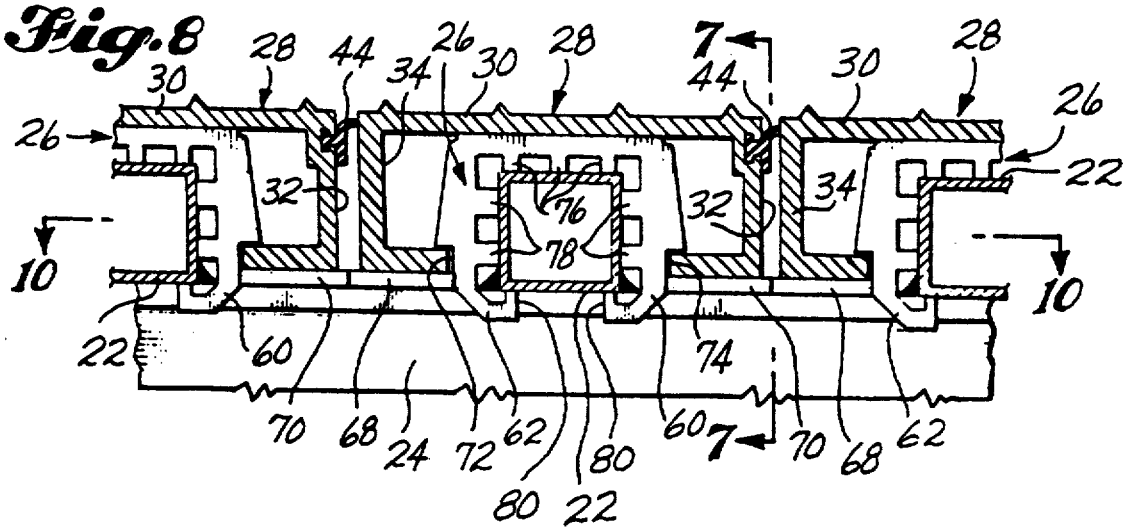
FIG. 8 is a cross-sectional view taken substantially along line 8—8 of FIG. 7.

The presence of the side openings or windows 58 would severely weaken the sidewall portions 50, 52, 54, 56, rendering the bearing 26 structurally inadequate, if it were not for the provision of a longitudinal wing 68, 70 on each side of the bearing 26. Each wing 68, 70 projects laterally outwardly from its side of the bearing 26, and has a bottom surface which rests on the top surface of the support beam 24. Each wing 68, 70 extends longitudinally of the bearing 26 and interconnects the two sidewalls 50, 54 or 52, 56 on its side of the bearing 26. Owing to the direction of its extent (it extends perpendicular to the sidewalls) it inherently stiffens and strengthens both of the sidewall portions to which it is connected. Further, and quite importantly, each wing 68, 70 includes an outer edge portion which makes abutting contact with the outer edge portion of the wind 68, 70 for the next bearing over on its side of its bearing 26 (FIGS. 8–10). This abutting contact between the outer edges of the wings 68, 70 prevents the sidewall portions 50, 52, 54, 56 of the bearings 26 from spreading apart in response to any upwardly directed force on the floor members which might occur.

As clearly shown in FIGS. 8 and 9, each sidewall portion 50, 52, 54, 56 includes a projecting shoulder which together with the wings 68, 70 on its side of the bearing 26 defines a generally square-shaped slot 72, 74. The inner edge portions of the bottom flanges 36, 38 are received within the slots 72, 74, and that is what holds the floor members 28 onto the bearings 26.

The use of a relatively small dimension guide tube 24, also makes it possible to thicken the wall portions of the bearings 26. This is particularly important in the region of the lock flanges 60, 62, 64, 66.

As shown in FIGS. 8 and 9, the top panel 48 of each bearing 26 is formed to include a plurality of longitudinally extending internal strengthening ribs 76. The sidewall portions 50, 52, 54, 56 of the bearings 26 include longitudinally extending, internal strengthening ribs 78. The lock flanges 60, 62, 65, 66 are formed to first slope downwardly and inwardly, generally from where the sidewall portions 50, 52, 54, 56 join the wings 68, 70. Then, the lock flanges 60, 62, 65, 66 extend laterally inwardly and at their inner extremities include upwardly projecting, longitudinally extending strengthening ribs 80 (FIG. 8).

The portions of the top wall 48 between the strengthening ribs 78 is made to be thinner than the regions of the sidewall portions 50, 52, 54, 56 between the strengthening ribs 78. This is done so that the top panel will bend more easily than the sidewalls.

The bearings are installed by setting them down onto the top of the guide beam 22 and then spreading the sides apart a sufficient amount to allow a space between the lock flanges 60, 62, 65, 66 sufficiently large to allow passage of the guide beam 22. The bearings 26 are merely pushed downwardly until the lock flanges 60, 62, 64, 66 clear the bottom surface portions of the guide beam 22, where they emerge on opposite sides of the support beam 24. When this happens, the sidewall portions 50, 52, 54, 56 of the bearings 26 act like springs and snap into place (FIG. 8).

As shown in FIG. 7, the inner ends of the lock flanges 60, 62, 64, 66 act to contain the bearing 26 in position relative to the transverse beam 24.

As shown in FIG. 8, the bottom surface of the top panel 30 of each floor members 28 may rest on the upper surface of the top 48 of the bearing. Or, the bottom surfaces of the floor member flanges 36, 38 may rest on the upper surfaces of the wings 68, 70. In some installations, a little of both will occur. The presence of the wings 68, 70, which are bearing surfaces, assures that at no time will there be metal-to-metal contact between the floor members 28 and the support frame members 24.

The location of the inner edge portions of the floor member flanges 36, 38 within the bearing slots 72, 74 functions to add the stiffness of the floor members 28 to the load system. That is, any force tending to lift a bearing 26, will encounter the stiffness of the floor member 28, bracing the wings, the sidewall portions and the lock flanges of the bearings 26 against movement. The fact that the lock flanges 60, 62, 64, 66 are made relatively thick in size, and the presence of the sloping wall portions of the lock flanges 60, 62, 64, 66 sufficiently strength such lock flanges against breakage. However, of most importance is that fact that the guide beams 22 are connected to the transverse beams 24 by quite large and strong welds. This fact assures against the breakage of the joint and the movement of the guide tubes 22 which would impose upward forces of the bearings. The use of the large weld connections is only made possible by the use of bearings 26 constructed as shown.

Referring again to FIGS. 11 and 12, in the illustrated embodiment the drive units 10, 12, 14 are identical. Each comprises a piston rod 83, 86, 87 having opposite end mounting portions by which they are secured to a pair of transverse frame beams 88, 90.

The further details of the hydraulic units 10, 12, 14 will be described with reference to hydraulic unit 12 which is shown in section in FIG. 15. A pair of clamp blocks are provided at each end of each piston rod 83, 85, 87. Each piston rod 83, 85, 87 is preferably threaded or otherwise machined at one end 92 and the clamp blocks 94, 96 at that end have matching internal threads or machining so that they will grip the rod 83, 85, 87 and restrain it from movement in the axial direction. The opposite end portions of the rods 83, 85, 87 may be smooth and the clamp blocks 98, 100 at that end have semicylindrical clamp surfaces which grip such end portions of the rods 83, 85, 87.

The upper clamp blocks 94, 98 are welded to the transverse tubes 88, 90. The lower clamp blocks 96, 100 are detachably secured in place by bolts 102 which extend through openings in the clamp blocks 96, 100 and thread into threaded openings formed in the clamp blocks 94, 98.

Each piston rod 83, 85, 87 includes a piston portion intermediate its ends. In FIG. 15 the piston portion is shown in the form of a pair of spaced apart piston members 104, 106. Preferably, the piston rods 83, 85, 87 are threaded in the regions 108, 110 and the piston members 104, 106 are cast directly onto the threaded portions 108, 110. They are then machined to size. The threads or some similar interlock machining at 108, 110 results in the piston members 104, 106 being firmly secured in place on the guide shaft 16, 18, 20.

Each piston member 104, 106 is provided with peripheral grooves for receiving wear rings and seal rings.

The space 112 between piston members 104, 106 is nonfunctional. Thus, the piston members 104, 106 function as if they were a single member. A single long piston member could be substituted for the two piston members 104, 106 but this is not desirable because it would increase the weight of the drive unit. Or, a short piston could be used which is provided with an axial extention at each end for depressing a check valve operator that will hereinafter be described.

Each of the drive units 10, 12, 14 includes a traveling cylinder 114, 116, 118. Each cylinder 114, 116, 118 includes a cylinder barrel portion 120 and a pair of end members 122, 124. The end members 122, 124 include reduced diameter inner end portions which are snuggly received within the ends of the barrel 120. The end members 122, 124 are thread connected to the end portions of the barrel 120.

For purposes of this discussion, the piston portion 104, 106 will be considered to be a single element.

Variable volume chambers 126, 128 are defined at the opposite ends of the piston portion, the fluid porting into and out from the chambers 126, 128 is formed in the end members 122, 124.

The hydraulic circuitry is not a part of the present invention and hence it is not disclosed. However, the hydraulic circuit is basically like the hydraulic circuit that is shown in FIG. 4 of the aforementioned U.S. Pat. No. 4,143,760. The check valves that are shown in FIG. 4 of U.S. Pat. No. 4,143,760 are built into the end members 122, 124.

Each end member 122, 124 is preferably grooved to receive a pair of wear rings 130, a seal 132 and a wiper 134. An additional seal 136 is provided between the inner end portion of the end member 122, 124 and the adjoining inner surface of the cylinder barrel 120.

Referring to FIG. 16, the check valve may include an elongated body 138 having an inner end portion 140 which projects through a bore 142. A shoulder formed at 144 defines a valve seat. A conical surface portion of a valve plug 146 is biased into engagement with the seat by means of a spring 148. Spring 148 is retained by a removable closure 150. An O-ring 154 is provided between the head of member 150 and an adjoining surface portion of the end member 122, 124. The inner end portion of the spring 148 fits into a socket formed in an end portion 156 of the valve member.

As should be evident, the spring 148 maintains the valve in a seated position except for those times when the piston portion has contacted end portion 140 and has moved the valve member to the right as pictured in FIG. 16.

Each cross frame member 16, 18, 20 is removably secured to a related one of the hydraulic drive units 10, 12, 14. In the illustrated embodiment this is done by clamps.

Referring to FIGS. 15 and 17 in particular, a pair of upper clamp parts 156, 158 are welded or otherwise secured to each transverse drive beam 16, 18, 20 in a position over the barrel 120 of the associated drive unit 10, 12, 14. Preferably, a machined section 160 is welded to a peripheral portion of the barrel 120 in the vicinity of the clamp 156. Threads of other lock elements are provided on the outer surface of the member 160. The arcuate inner surface 162 of clamp member 156 is formed with interlocking machining so that when the clamp is secure its connection with the drive unit 10, 12, 14 will lock the transverse drive beam 16, 18, 20 to the barrel 120 of its drive unit 10, 12, 14 and will prevent movement between the two in the direction of applied force.

As best shown by FIG. 17, each clamp includes a removable lower portion 164, 166 which includes an arcuate inner surface 168 which matches the curvature of the cylinder barrel 120. Securement bolts 170 extend through openings in the removable clamp part 164 and thread into threaded sockets formed in the fixed clamp parts 156, 158.

The connection of the guide shafts to the members 88, 90 will serve to integrate the parts of the mechanism. It might also be desired to provide the assembly with a pair of longitudinal beams 172, 174 which are welded at their ends to the members 88, 90. Members 172, 174, and members 88, 90 may be lengths of square tubing, as shown in FIGS. 13–15. If members 172, 174 are employed, strips of a suitable plastic bearing material 176 are secured to the top portions of the members 172, 174, to provide load carrying supports for the transverse drive members 16, 18, 20.

Figure 11:
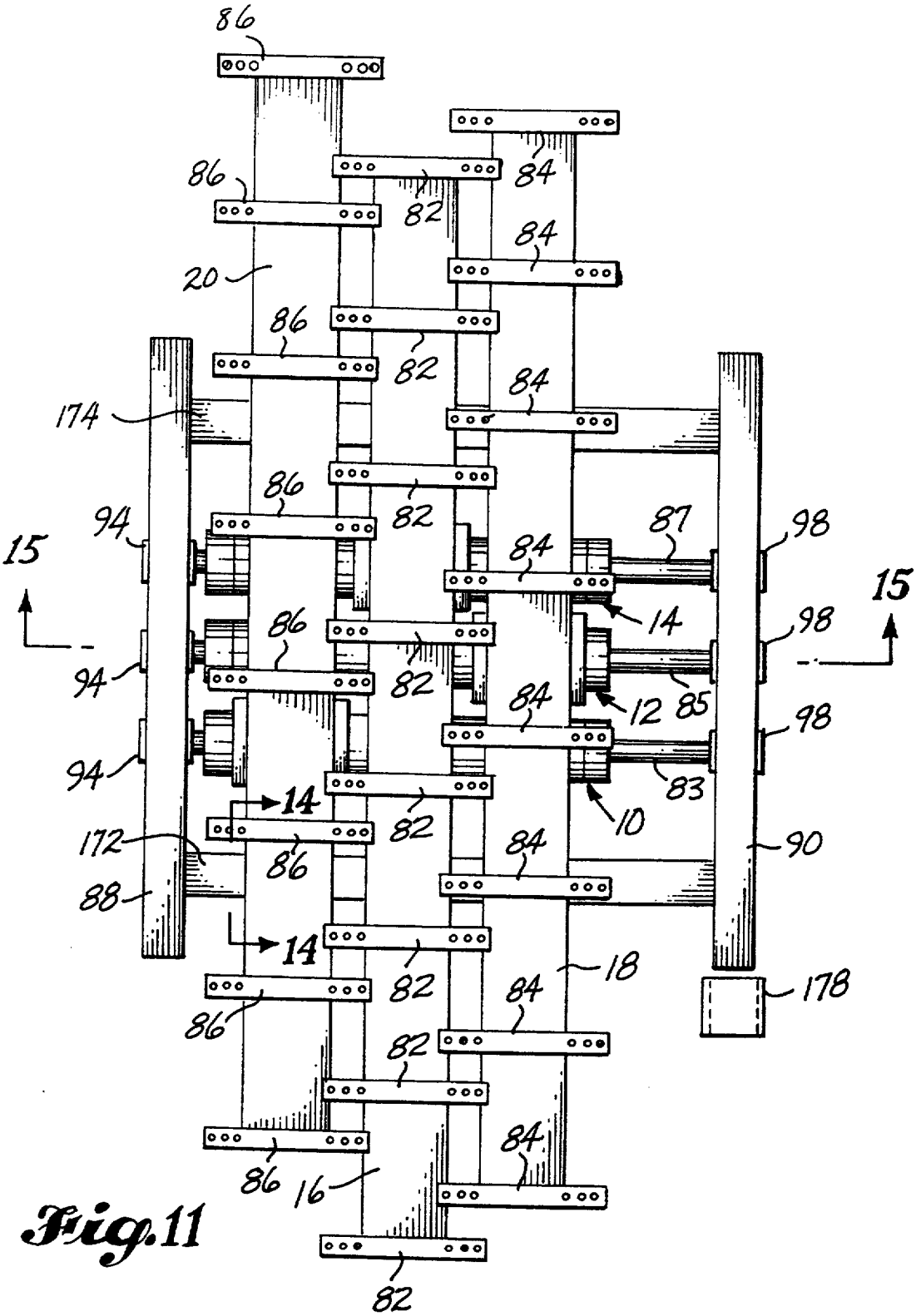
FIG. 11 is a top plan view of an embodiment of the drive assembly of the present invention.
Figure 12:
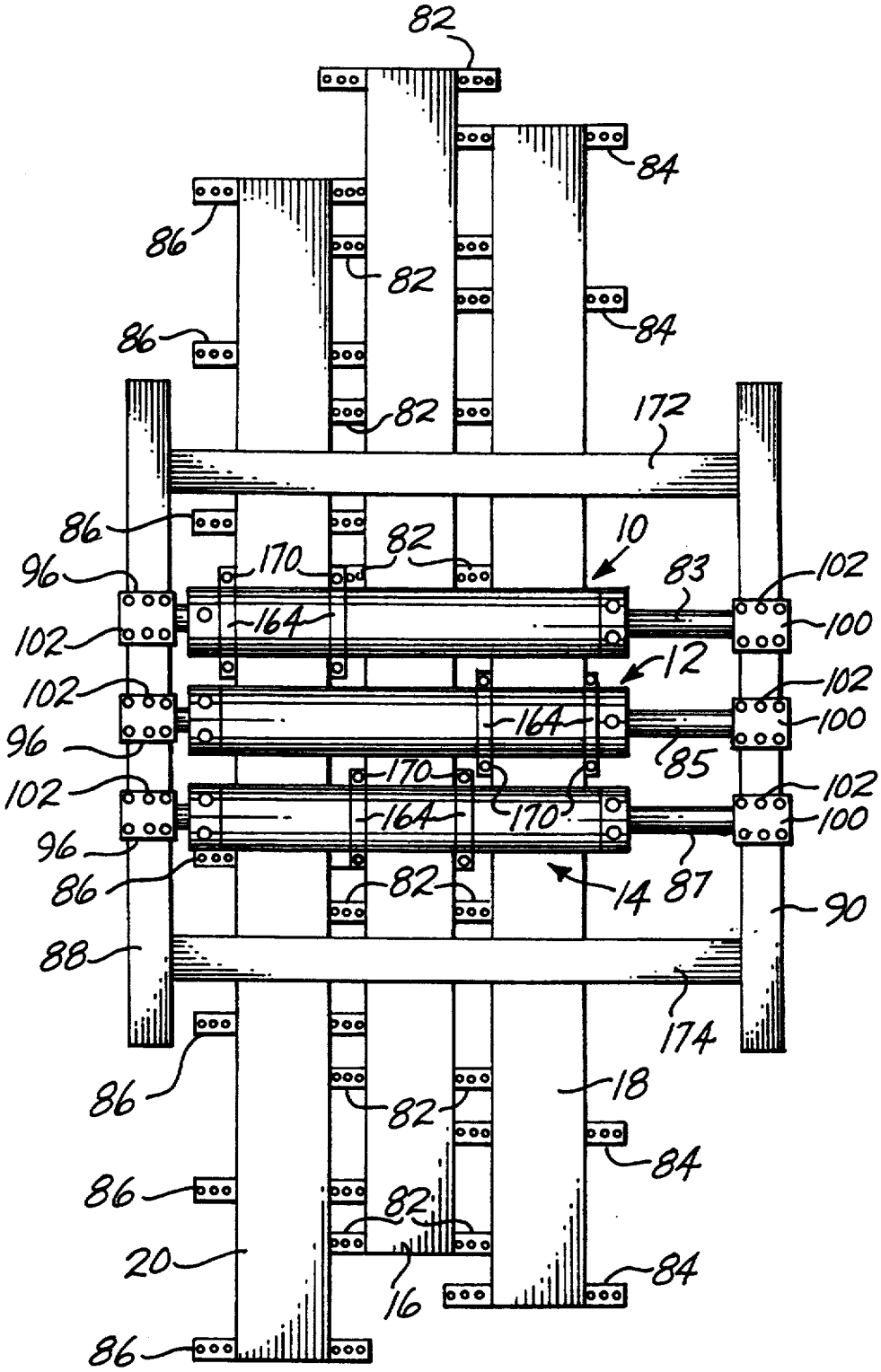
FIG. 12 is a bottom plan view of the assembly shown by FIG. 11.
Figure 18:
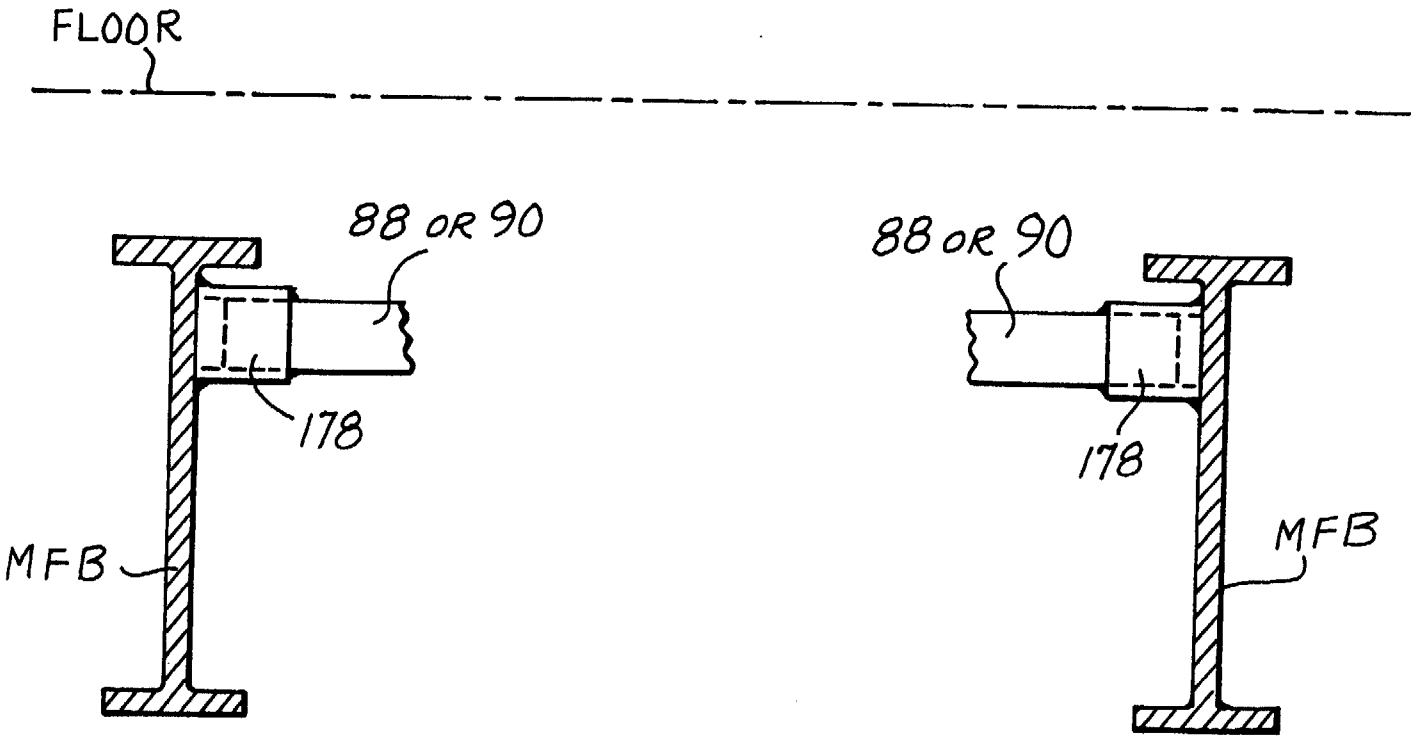
*FIG. 18 is an end view showing the preferred installation of the transverse frame beams to the main frame beams.*

The drive mechanism may be mounted between two beams in the manner disclosed in the aforementioned copending application my aforementioned U.S. Pat. No. [4,974,285] *4,474,285*. Such manner of installation requires the use of tubular mounting members, one of which is shown in FIG. 11 and is designated 178. As disclosed in my aforementioned U.S. Pat. No. [4,974,285] *4,474,285*, a tubular member like 178 is provided at each end of each member 88, 90. As shown in FIG. 18, the length of members 88, 90 is slightly less than the lateral spacing between two main frame beams MFB. The members 178 are installed on the end portions of members 88, 90 and are moved endwise inwardly. Then, the mechanisms is positioned between the two main frame beams MFB. Then, the members 178 are moved outwardly and at their outer ends are welded to the main frame beams MFB. Then, they are welded at their inner ends to the members 88, 90. In some installations it is also desirable to add diagonal bracing.

The drive mechanism of the present invention is characterized by a relatively small number of members and a low weight. This is contributable to the fact that the guide rods and pistons are fixed, the cylinder portions of the drive units 10, 12, 14 are movable, and the transverse drive beams 16, 18, 20 are directly secured to the barrel portion of the movable cylinders.

It is contemplated that in other installations shorter cylinders may be used. For example, each cylinder may project only a small distance outwardly from each side of its transverse drive beam. In an arrangement of this type the cylinders would not be side-by-side but rather would be staggered in position. That is, one of the short cylinders would be centered relative to drive beam 16, a second would be centered to drive beam 18 and the third would be centered relative to drive beam 20. This could be accomplished by using piston rods which span the full distance between the frame members 88, 90, but on which the piston heads are staggered. Or, short piston rods could be used and the frame could be altered.

From the foregoing, various further modifications, component arrangements, and mode of utilization of the reciprocating floor conveyor of the invention will be apparent to those skilled in the art to which the invention is addressed, within the scope of the following claims.

What is claimed is:

1. For use in a reciprocating floor conveyor of a type comprising a plurality of floor slat members mounted adjacent to each other for longitudinal reciprocation, and divided into sets, a hydraulic assembly for moving all of the floor slat members together in one direction, for advancing a load, and for retracting them in the opposite direction, one set at a time, characterized by:

a pair of spaced apart end frame members which extend transversely of the conveyor;

a plurality of transverse drive beams, one for each set of floor slat members, each transverse drive beam including means for connecting it to its set of floor slat members;

a plurality of reversible linear hydraulic drive units, each drive unit comprising fixed piston rod means having two opposite end mounting portions, piston head means fixed in position on the piston rod means, and a cylinder body mounted to reciprocate back and forth along said piston rod means, said cylinder and said piston head means together defining variable volume fluid chambers;

said drive units being positioned to place the cylinder bodies directly below the transverse drive beams;

means securing the opposite end mounting portions of the piston rod means to the end frame members;

a pair of longitudinal beams positioned laterally outwardly adjacent the drive units, and structurally interconnecting the two end frame members; and means connecting each cylinder body to a related transverse drive beam comprising an upper clamp member attached to the transverse drive beam and having a lower portion shaped to engage the cylinder body, a lower clamp member having an upper portion shaped to engage the cylinder body, and removable connectors for detachably securing the two clamp members together; and wherein in use said transverse drive beams are moved by said drive units back and forth within a space between the two end frame members.

2. A hydraulic drive assembly according to claim 1, wherein each cylinder body and at least one of its clamp members include interlocking portions which serve to prevent the cylinder body from moving longitudinally relative to the clamp member.

3. A hydraulic drive assembly according to claim 2, wherein said plurality of floor slat members, transverse drive beams and hydraulic drive units comprise three sets of floor slat members, three transverse drive beams, and three reversible linear hydraulic drive units respectively.

4. A hydraulic drive assembly according to claim 3, wherein a first transverse drive beam at a first end of the assembly is connected to an end portion of a first reversible linear hydraulic drive unit that is located at one side of the assembly, a second transverse drive beam is connected to a second reversible linear hydraulic drive unit that is next to the first reversible linear hydraulic drive unit, at an end portion thereof opposite the end portion to which the first reversible linear hydraulic drive unit is connected, and a third transverse drive beam is connected to a center portion of a third reversible linear hydraulic drive unit that is next to the second reversible linear hydraulic drive unit.

5. For use in a reciprocating floor conveyor of a type comprising a plurality of floor slat members mounted adjacent to each other for longitudinal reciprocation, and divided into three sets, and a hydraulic drive assembly for moving the floor slat members in one direction, for advancing a load, and for retracting them in the opposite direction, said hydraulic drive assembly being characterized by:

a pair of parallel longitudinally spaced apart mounting frame members which extend transversely of the conveyor;

three transverse drive beams, one for each set of floor slat members, each transverse drive beam including means for connecting it to its set of floor slat members;

three reversible linear hydraulic drive units, one for each transverse drive beam, each drive unit comprising fixed opposite end portions which are secured to the mounting frame members and a movable central portion which reciprocates back and forth between the mounting frame members, said fixed and movable portions *being piston and cylinder components and including two longitudinally spaced piston head members, two longitudinally spaced cylinder head members, piston rod end portions and cylinder sidewall portions,* together defining variable volume fluid chambers;

*said movable central portion being a continuous structural member including a said head member at each of its ends, each of which head members includes a fluid contacting end surface of a said variable volume fluid chamber;*

*said linear hydraulic drive units transmitting downward forces from the transverse drive beams to the mounting frame members;* said transverse drive beams being positioned *within a space immediately* between the mounting frame members, each over a movable portion of a related one of the linear hydraulic drive units;

means connecting the movable *central* portion of each linear hydraulic drive unit to its related transverse drive beam;

wherein in use said transverse drive beams are moved by said linear hydraulic drive units back and forth within the space *immediately* between the mounting frame members; and wherein one of the transverse drive beams is connected to a center section of the movable portion of its drive unit, a second of said transverse drive beams is connected to a section of the movable portion of its drive unit which is offset from center towards a first of said mounting frame members, and a third of said transverse drive beams is connected to a section of the movable portions of its drive unit which is offset from center towards the second mounting frame member.

6. The hydraulic drive assembly according to claim 5, wherein each reversible linear hydraulic drive unit comprises a two part clamp secured to the movable portion of the reversible linear hydraulic drive unit, and means connecting one of said parts to the transverse drive beam associated with said reversible linear hydraulic drive unit.

7. The hydraulic drive assembly of claim 5, further comprising at least two longitudinal frame members interconnected between the transverse mounting frame members, laterally outwardly on opposite sides of the plurality of drive units, and slide bearing means positioned vertically between the transverse drive beams and the longitudinal beams, and connected to one and making sliding contact with the other.

8. The hydraulic drive assembly of claim 5, wherein the means connecting the transverse drive beam to the movable portion of the drive unit comprises an upper clamp member attached to the transverse drive beam having a lower portion shaped to engage the movable portion of the drive unit, a lower clamp member having an upper portion shaped to engage the movable portion of the drive unit, and removable connecting means for detachably securing the two clamp members together.

9. A conveyor installation for a vehicle comprising:

a reciprocating floor conveyor of a type comprising a plurality of floor slat members mounted adjacent to each other for longitudinal reciprocation, and divided into three sets, a hydraulic drive assembly for moving the floor slat members in one direction, for advancing a load, and for retracting them in the opposite direction, said hydraulic drive assembly being characterized by:

a vehicle mainframe comprising a pair of longitudinally extending, laterally spaced apart, mainframe beams;

a conveyor frame comprising a pair of spaced apart mounting frame members which extend transversely of the conveyor and at their ends are connected to the two mainframe beams, three transverse drive beams, one for each set of floor slat members, each transverse drive beam including means for connecting it to its set of floor slat members;

three reversible linear hydraulic drive units, one for each transverse drive beam, each drive unit comprising fixed opposite end portions which are secured to the mounting frame members and movable portions which reciprocate back and forth between the mounting frame *end* members, said fixed and movable portions *being piston and cylinder components and including two longitudinally spaced piston head members, two longitudinally spaced cylinder head members, piston rod end portions and cylinder sidewall portions,* together defining variable volume fluid chambers;

*said movable central portion being a continuous structural member including a said head member at each of its ends, each of which head members includes a fluid contacting end surface of a said variable volume fluid chamber;*

*said linear hydraulic drive units transmitting downward forces from the transverse drive beams to the mounting frame members;* said linear hydraulic drive units being positioned between the two longitudinal mainframe beams, said transverse drive beams being positioned above the longitudinal mainframe beams, in a space longitudinally between the two mounting frame members, each over a moving portion of a related one of the linear hydraulic drive units, and each having opposite end portions which project laterally outwardly from the longitudinal mainframe beams *for connection to floor slat members which are laterally outwardly of said mainframe beams;* means connecting the movable portion of each linear hydraulic drive unit to its related transverse drive beam;

wherein in use said transverse drive beams are moved by said linear hydraulic drive units back and forth within the space between the mounting frame members; and wherein one of the transverse drive beams is connected to a center section of the movable portion of its drive unit, a second of said transverse drive beams is connected to a section of the movable portion of its drive unit which is offset from center towards a first of said mounting frame members, and a third of said transverse drive beams is connected to a section of the movable portion of its drive unit which is offset from center towards the second mounting frame member.

10. The conveyor installation of claim 9, wherein said hydraulic drive assembly further comprises a pair of longitudinal frame members positioned inwardly of the mainframe beams and structurally interconnecting the mounting frame members.

11. [The] *A* conveyor installation [of claim 9,] *for a vehicle comprising:*

*a reciprocating floor conveyor of a type comprising a plurality of floor slat members mounted adjacent to each other for longitudinal reciprocation, and divided into three sets, a hydraulic drive assembly for moving the floor slat members in one direction, for advancing a load, and for retracting them in the opposite direction, said hydraulic drive assembly being characterized by:*

*a vehicle mainframe comprising a pair of longitudinally extending, laterally spaced apart, mainframe beams;*

*a conveyor frame comprising a pair of spaced apart mounting frame members which extend transversely of the conveyor and at their ends are connected to the two mainframe beams;*

*three transverse drive beams, one for each set of floor slat members, each transverse drive beam including means for connecting it to its set of floor slat members;*

*three reversibly linear hydraulic drive units, one for each transverse drive beam, each drive unit comprising fixed opposite end portions which are secured to the mounting frame members and movable portions which reciprocate back and forth between the mounting frame members, said fixed and movable portions together defining variable volume fluid chambers;*

*said linear hydraulic drive units being positioned between the two longitudinal mainframe beams;*

*said transverse drive beams being positioned above the longitudinal mainframe beams, in a space longitudinally between the two mounting frame members, each over a moving portion of a related one of the linear hydraulic drive units, and each having opposite end portions which project laterally outwardly from the longitudinal mainframe beams;*

*means connecting the movable portion of each linear hydraulic drive unit to its related transverse drive beam;*

*wherein in use said transverse drive beams are moved by said linear hydraulic drive units back and forth within the space between the mounting frame members;*

*wherein one of the transverse drive beams is connected to a center section of the movable portion of its drive unit, a second of said transverse drive beams is connected to a section of the moveable portion of its drive unit which is offset from center towards a first of said mounting frame members, and a third of said transverse drive beams is connected to a section of the movable portion of its drive unit which is offset from center towards the second mounting frame member; and*

*said conveyor installation* further comprising connector means at the ends of the mounting frame members which are connected to the mainframe beams and serve to connect the conveyor frame to the mainframe beams.

12. The conveyor installation of claim 9, wherein the means connecting the transverse drive beam to the movable portion of the drive unit comprises an upper clamp member attached to the transverse drive beam having a lower portion shaped to engage the movable portion of the drive unit, a lower clamp member having an upper portion shaped to engage the movable portion of the drive unit, and removable connection means for detachably securing the two clamp members together.

13. The conveyor installation of claim 9, further comprising at least two longitudinal frame members interconnected between the transverse mounting frame members, laterally outwardly on opposite sides of the plurality of drive units, and slide bearing means positioned vertically between the transverse drive beams and the longitudinal beams, and connected to one and making sliding contact with the other.

14. For use in a reciprocating floor conveyor of a type comprising a plurality of floor slat members mounted adjacent to each other for longitudinal reciprocation, and divided into sets, and a hydraulic drive assembly for moving the floor slat members in one direction, for advancing a load, and for retracting them in the opposite direction, said hydraulic drive assembly being characterized by:

a pair of longitudinally spaced part mounting frame members which extend transversely of the conveyor;

a plurality of reversible linear hydraulic drive units, one for each transverse drive beam, each drive unit comprising fixed opposite end portions which are secured to the mounting frame members and a movable portion which reciprocates back and forth between the mounting frame *end* members, said fixed and movable portions *being piston and cylinder components and including two longitudinally spaced piston head member, two longitudinally spaced cylinder head members, piston rod end portions and cylinder sidewall portions,* together defining variable volume fluid chambers;

*said movable central portion being a continuous structural member including a said head member at each of its ends, each of which head members includes a fluid contacting end surface of a said variable volume fluid chamber;*

*said linear hydraulic drive units transmitting downward forces from the transverse drive beams to the mounting frame end members;* said transverse drive means being positioned *in a space immediately* between the mounting frame *end* members, each over a movable portion of a related one of the linear hydraulic drive units;

means for detachably connecting each transverse drive beam to the movable portion of its drive unit comprising an upper clamp member attached to the transverse drive beam having a lower portion shaped to engage the movable portion of the drive unit, a lower clamp member having an upper portion shaped to engage the movable portion of the drive unit, and removable connectors for detachably securing the two clamp members together; and wherein in use said transverse drive beams are moved by said linear hydraulic drive units back and forth within the space *immediately* between the mounting frame members.

15. A reciprocating floor type conveyor, comprising:

at least three sets of floor slat members which are mounted adjacent to each other for longitudinal reciprocation;

a plurality of transverse drive beams, one for each set of floor slat members, each transverse drive beam including means for connecting it to its set of floor slat members;

a plurality of reversible linear hydraulic drive units, one for each transverse drive beam and the set of floor slat members connected thereto, each said drive unit comprising an elongated piston rod having two opposite end mounting portions, a piston portion fixed on a mid part of the piston rod, and a cylinder mounted to reciprocate back and forth on said piston rod, said cylinder and said piston portion together defining two variable volume chambers, one outwardly from each end of the piston portion;

said drive units being positioned to place said cylinders directly below the transverse drive beams;

means for connecting each cylinder to its transverse drive beam;

wherein in use said transverse drive beams are moved by said drive units back and forth within a space which is between the opposite end mounting portions of the piston rods; and means for detachably connecting each transverse drive beam to its cylinder comprising an upper clamp member attached to the transverse drive beam having a lower portion shaped to engage the cylinder, a lower clamp member having an upper portion shaped to engage the cylinder, and removable connectors for detachably securing the two clamp members together.

16. A reciprocating floor type conveyor according to claim 15, wherein the cylinder and at least one of the clamp members include interlocking portions which serve to prevent the cylinder from moving longitudinally relative to the clamp member.

17. A reciprocating floor type conveyor according to claim 15, further comprising a pair of transverse frame members associated with the opposite end mounting portions of the elongated piston rods, and means for detachably securing the mounting portions of the piston rods to said transverse frame members, so that said piston rods and said transverse frame members together form a support frame for the drive units.

18. A reciprocating floor type conveyor according to claim 17, further comprising at least two longitudinal frame members interconnected between the transverse frame members, outwardly on opposite sides of the plurality of drive units.

19. A reciprocating floor type conveyor, comprising:

at least three sets of floor slat members which are mounted adjacent to each other for longitudinal reciprocation;

a plurality of transverse drive beams, one for each set of floor slat members, each transverse drive beam including means for connecting it to its set of floor slat members;

a plurality of reversible linear hydraulic drive units, one for each transverse drive beam and the set of floor slat members connected thereto, each said drive unit comprising an elongated piston rod having two opposite end mounting portions, a piston portion fixed on a mid part of the piston rod, and a cylinder mounted to reciprocate back and forth on said piston rod, said cylinder and said piston portion together defining two variable volume chambers, one outwardly from each end of the piston portion;

said drive units being positioned to place said cylinders directly below the transverse drive beams;

means for connecting each cylinder to its transverse drive beam;

wherein in use said transverse drive beams are moved by said drive units back and forth within a space which is between the opposite end mounting portions of the piston rods;

a pair of transverse frame members associated with the opposite end mounting portions of the elongated piston rod;

means for detachably securing the mounting portions of the piston rods to said transverse frame members, so that said piston rods and said transverse frame members together form a support frame for the drive units;

at least two longitudinal frame members interconnected between the transverse frame members, outwardly on opposite sides of the plurality of drive units;

slide bearing means carried by the longitudinal frame members, and wherein the transverse drive beams make sliding contact with said slide bearing means;

means for detachably connecting each transverse drive beam to its cylinder comprising an upper clamp member attached to the transverse drive beam having a lower portion shaped to engage the cylinder, a lower clamp member having an upper portion shaped to engage the cylinder, and removable connectors for detachably securing the two clamp memebers together.

20. A reciprocating floor type conveyor according to claim 19 wherein the cylinder and at least one of the clamp members include interlocking portions which serve to prevent the cylinder from moving longitudinally relative to the clamp member.

21. A reciprocating floor type conveyor according to claim 19, wherein each transverse frame member includes a projecting end portion at each of its ends, and said conveyor further includes a mounting member of tubular form telescopically received on each said end portion, said mounting member being adapted to be welded at its outer end to a frame structure in an installation, and at its inner end to the transverse frame member.

22. A reciprocating floor type conveyor, comprising:

at least three sets of floor slat members which are mounted adjacent to each other for longitudinal reciprocation;

a plurality of transverse drive beams, one for each set of floor slat members, each transverse drive beam including means for connecting it to its set of floor slat members;

a plurality of reversible linear hydraulic drive units, one for each transverse drive beam and the set of floor slat members connected thereto, each said drive unit comprising an elongated piston rod having two opposite end mounting portions, a piston portion fixed on a mid part of the piston rod, and a cylinder mounted to reciprocate back and forth on said piston rod, said cylinder and said piston portion together defining two variable volume chambers, one outwardly from each end of the piston portion;

said drive units being positioned to place said cylinders directly below the transverse drive beams;

means for connecting each cylinder to its transverse drive beam;

wherein in use said transverse drive beams are moved by said drive units back and forth within a space which is between the opposite end mounting portions of the piston rods; and wherein one of the transverse drive beams is connected to a first end portion of its cylinder, another transverse drive beam is connected to the opposite end portion of its cylinder, and a third transverse drive beam is connected to a midportion of its cylinder.

23. A reciprocating floor type conveyor according to claim 22, further comprising a pair of transverse frame members associated with the opposite end mounting portions of the elongated piston rods, and means for securing the mounting portions of the piston rods to said transverse frame members, so that said piston rods and said transverse frame members together form a support frame for the drive units.

24. A reciprocating floor type conveyor according to claim 23, further comprising at least two longitudinal frame members interconnected between the transverse frame members, outwardly on opposite sides of the plurality of drive units.

25. A reciprocating floor type conveyor according to claim 24, further including slide bearing means carried by the longitudinal frame members, and wherein the transverse drive beams make sliding contact with said slide bearing means.

26. For use in a reciprocating floor conveyor of a type comprising a plurality of sets of floor slat members which are mounted adjacent to each other for longitudinal reciprocation, a hydraulic assembly for moving the floor slat members in one direction, for advancing a load, and for retracting them in the opposite direction, characterized by:

a frame comprising a pair of spaced apart transverse frame members;

a plurality of transverse drive beams, one for each set of floor slat members, each transverse drive beam including means for connecting it to its set of floor slat members;

a plurality of reversible linear hydraulic drive units, each drive unit comprising an elongated piston rod having two opposite end mounting portions, a piston portion fixed on the mid part of a piston rod, and a cylinder mounted to reciprocate back and forth on said piston rod, said cylinder and said piston portion together defining two variable volume chambers, one outwardly from each end of the piston portion;

said drive units being positioned to place said cylinders directly below the transverse drive beams;

means securing the opposite end mounting portions of the piston rods to midportions of the transverse frame members, such that the piston rods structurally interconnect the two transverse frame members;

means for connecting each cylinder to its transverse drive beam comprising an upper clamp member attached to the transverse drive beam and having a lower portion shaped to engage the cylinder, a lower clamp member having an upper portion shaped to engage the cylinder, and removable connectors for detachably securing the two clamp members together; and wherein in use said transverse drive beams are moved by said drive units back and forth within a space which is between the two transverse frame members.

27. A hydraulic drive assembly according to claim 26, wherein the cylinder and at least one of the clamp members include interlocking portions which serve to prevent the cylinder from moving longitudinally relative to the clamp member.

28. A hydraulic drive assembly according to claim 26, further comprising at least two longitudinal frame members interconnected between the transverse frame members, on opposite sides of the plurality of drive units.

29. For use in a reciprocating floor conveyor of a type comprising a plurality of floor slat members mounted adjacent to each other for longitudinal reciprocation, and divided into three sets, a hydraulic assembly for moving all of the floor slat members together in one direction, for advancing a load, and for retracting them in the opposite direction, one set at a time, characterized by:

a pair of spaced apart end frame members which extend transversely of the conveyor;

three transverse drive beams, one for each set of floor slat members, each transverse drive beam including means for connecting it to its set of floor slat members;

three reversible linear hydraulic drive units, each drive unit comprising fixed piston rod means having two opposite end mounting portion, piston head means fixed in position on the piston rod means, and a cylinder body mounted to reciprocate back and forth along said piston rod means, said cylinder and said piston head means together defining variable volume fluid chambers;

said drive units being positioned to place the cylinder bodies directly below the transverse drive beams;

means securing the opposite end mounting portions of the piston rod means to the end frame members;

means connecting each cylinder body to a related transverse drive beam;

a pair of longitudinal beams positioned laterally outwardly adjacent the drive units, and structurally interconnecting the two end frame members;

wherein in use said transverse drive beams are moved by said drive units back and forth within a space between the two end frame members; and wherein a first said transverse drive beam is connected to an end portion of a first reversible linear hydraulic drive unit, a second said transverse drive beam is connected to a second said reversible linear hydraulic drive unit, at an end portion thereof opposite the end portion to which the first reversible linear hydraulic drive unit is connected, and a third said transverse drive beam is connected to a center portion of a third said reversible linear hydraulic drive unit.

30. A hydraulic drive assembly according to claim 29, wherein said piston head means comprises a pair of axially spaced apart piston heads, and said piston rod means includes a piston rod portion connected to each piston head and extending outwardly therefrom to the mounting frame member at its end of the assembly, and wherein a variable volume fluid chamber is formed by the cylinder body and each piston head, outwardly of the piston head.

31. A reciprocating floor type conveyor according to claim 29, wherein the means for detachably connecting each transverse drive beam to its cylinder comprises an upper clamp member attached to the transverse drive beam having a lower portion shaped to engage the cylinder, a lower clamp member having an upper portion shaped to engage the cylinder, and removable connectors for detachably securing the two clamp members together.

32. A reciprocating floor type conveyor according to claim 31, wherein the cylinder and at least one of the clamp members include interlocking portions which serve to prevent the cylinder from moving longitudinally relative to the clamp member.

33. For use in a reciprocating floor conveyor of a type comprising a plurality of floor slat members mounted adjacent to each other for longitudinal reciprocation, and divided into sets, and a hydraulic drive assembly for moving the floor slat members in one direction, for advancing load, and for retracting them in the opposite direction, said hydraulic drive assembly being characterized by:

a pair of longitudinally spaced apart mounting frame members which extend transversely of the conveyor;

a plurality of transverse drive beams, one for each set of floor slat members, each transverse drive beam including means for connecting it to its set of floor slat members;

a plurality of reversible, side-by-side positioned linear hydraulic drive units, one for each transverse drive beam, each drive unit comprising fixed opposite end portions which are *detachably* secured to the mounting frame members and a movable *central* portion which reciprocates back and forth between the mounting frame members, said fixed and movable portions *being piston and cylinder components and including two longitudinally spaced piston head members, two longitudinally spaced cylinder head members, piston rod end portions and cylinder side-*

*wall portions,* together defining volume fluid chambers;

*said movable central portion being a continuous structural member including a said head member at each of its ends, each of which head members includes a fluid contacting end surface of a said variable volume fluid chamber;*

*said linear hydraulic drive units transmitting downward forces from the transverse drive beams to the mounting frame members;* at least two longitudinal *mounting* frame members interconnected between the mounting frame members *immediately outwardly adjacent said drive units;* said transverse drive beams being positioned side-by-side longitudinally between the mounting frame members, each over a movable *central* portion of a related one of the linear hydraulic drive units;

connector means accessible from below the hydraulic drive assembly for detachably connecting the movable *central* portion of each linear hydraulic drive unit to its related transverse drive beam, each connector means being longitudinally offset from each other connector means, so as to place each connector means below its *transverse* drive beam; and wherein in use said transverse drive beams are moved by said linear hydraulic drive units back and forth within said space between the two [end] *mounting* frame members[.] *; and*

*wherein the opposite end portions of the drive units can be detached from the mounting frame members, and the movable central portions of the drive units can be detached from the transverse drive beams, and then the drive units can be dropped downwardly free of the mounting frame members and free of the transverse drive beams.*

*34. For use in a reciprocating floor conveyor installation of a type comprising a frame including a pair of laterally spaced apart mainframe beams; a framework on said mainframe beams which is substantially wider than the lateral spacing of said mainframe beams, and a plurality of floor slat members mounted adjacent to each other on said framework, for longitudinal reciprocation, and divided into three sets, and a hydraulic drive assembly for moving the floor slat members in one direction, for advancing a load, and for retracting them in the opposite direction, said hydraulic drive assembly being characterized by:*

*a mounting frame comprising a pair of parallel longitudinally spaced apart mounting frame end members which extend transversely of the conveyor and a pair of parallel laterally spaced apart longitudinal frame members interconnecting said mounting frame end members;*

*three transverse drive beams, one for each set of floor slat members, each transverse drive beam including means for connecting it to its set of floor slat members;*

*three reversible linear hydraulic drive units, one for each transverse drive beam, each drive unit comprising fixed opposite end portions which are secured to the mounting frame end members and a movable central portion which reciprocates back and forth between the mounting frame members, said fixed and movable portions being piston and cylinder components and including two longitudinally spaced piston head members, two longitudinally spaced cylinder head members, piston rod end portions and cylinder sidewall portions, together defining variable volume fluid chambers;*

*said movable central portion being a continuous structural member including a said head member at each of its ends, each of which head members includes a fluid contacting end surface of a said variable volume fluid chamber;*

*said drive units transmitting downward forces from the transverse drive beams to the mounting frame end members;*

*said transverse drive beams being positioned within a space immediately between the mounting frame end members, each over a movable portion of a related one of the linear hydraulic drive units;*

*means connecting the movable portion of each linear hydraulic drive unit to its related transverse drive beam;*

*wherein in use said transverse drive beams are moved by said linear hydraulic drive units back and forth within the space immediately between the mounting frame end members;*

*wherein one of the transverse drive beams is connected to a center section of the movable portion of its drive unit, a second of said transverse drive beams is connected to a section of the movable portion of its drive unit which is offset from center towards a first of said mounting frame end members, and a third of said transverse drive beams is connected to a section of the movable portions of its drive unit which is offset from center towards the second mounting frame end member; and*

*said drive assembly being adapted to be mounted in the conveyor installation with the mounting frame and the drive units laterally between the mainframe beams, with the transverse drive beams above the mainframe beams, with opposite end portions of said transverse drive beams projecting laterally outwardly from the mainframe beams for connecting to floor slat members which are laterally outwardly of said mainframe beams, and with the mounting frame connected to the mainframe beams.*

*35. For use in a reciprocating floor conveyor of a type comprising a plurality of floor slat members mounted adjacent to each other for longitudinal reciprocation, and divided into three sets, and a hydraulic drive assembly for moving the floor slat members in one direction, for advancing a load, and for retracting them in the opposite direction, said hydraulic drive assembly being characterized by:*

*a mounting frame comprising a pair of parallel longitudinally spaced apart mounting frame end members which extend transversely of the conveyor and a pair of longitudinal frame members structurally interconnecting the mounting frame end members, said mounting frame having opposite side boundaries;*

*three transverse drive beams, one for each set of floor slat members, each transverse drive beam including means for connecting it to its set of floor slat members and each transverse drive beam having opposite end portions which project laterally outwardly from the side boundaries of said mounting frame, for connection to floor slat members located outwardly of said side boundaries of the mounting frame;*

*three reversible linear hydraulic drive units, one for each transverse drive beam, each drive unit comprising fixed opposite end portions which are secured to the mounting frame members and a movable central portion which reciprocates back and forth between the mounting frame end members, said fixed and movable portions being piston and cylinder components and including two longitudinally spaced piston head members, two longitudinally spaced cylinder head*

*members, piston rod end portions and cylinder sidewall portions, together defining variable volume fluid chambers;*

*said movable central portion being a continuous structural member including a said head member at each of its ends, each of which head members includes a fluid contacting end surface of a said variable volume fluid chamber;*

*said linear hydraulic drive units transmitting downward forces from the transverse drive beams to the mounting frame end members;*

*said transverse drive beams being positioned within a space between the mounting frame members, each over a movable portion of a related one of the linear hydraulic drive units;*

*means connecting the movable portion of each linear hydraulic drive unit to its related transverse drive beam;*

*wherein in use said transverse drive beams are moved by said linear hydraulic drive units back and forth within the space between the mounting frame end members; and*

*wherein one of the transverse drive beams is connected to a center section of the movable portion of its drive unit, a second of said transverse drive beams is connected to a section of the movable portion of its drive unit which is offset from center towards a first of said mounting frame end members, and a third of said transverse drive beams is connected to a section of the movable portions of its drive unit which is offset from center towards the second mounting frame end member.*

*36. A hydraulic drive assembly according to claim 35, wherein said fixed opposite end portions of the drive units are secured to the mounting frame end members by fixed connections which restrain the drive unit end portions against pivotal movement relative to the mounting frame end members.*

* * * * *

UNITED STATES PATENT AND TRADEMARK OFFICE

CERTIFICATE OF CORRECTION

PATENT NO: Re. 35,022

DATED: August 22, 1995

INVENTOR(S): Raymond Keith Foster

It is certified that error appears in the above-identified patent and that said Letters Patent are hereby corrected as shown below:

In Section [57], "Abstract," in the third line, "of two" should be -- to two --; and in the eighth line, "set" should be -- sets --.

In column 1, line 37, "Olaf" should be -- Olof --.

In column 5, line 33, "60, 62, 64, 65, 66" should be -- 60, 62, 64, 66 --.

In column 5, line 52, "wind" should be -- wing --.

In column 5, line 57, "members" should be -- member --.

In column 6, lines 6, 9 and 21, "60, 62, 65, 66" should be -- 60, 62, 64, 66 --.

In column 6, line 33, "members" should be -- member --.

In column 6, line 52, "strength" should be -- strengthen --.

In column 6, line 53, "that", first occurrence, should be -- the --.

In column 6, line 57, "of" should be -- on --.

In column 6, line 63, "83, 86, 87" should be -- 83, 85, 87 --.

UNITED STATES PATENT AND TRADEMARK OFFICE

CERTIFICATE OF CORRECTION

PATENT NO: Re. 35,022

DATED: August 22, 1995

INVENTOR(S): Raymond Keith Foster

It is certified that error appears in the above-identified patent and that said Letters Patent are hereby corrected as shown below:

In column 7, line 36, "extention" should be -- extension --.

In column 8, line 22, "of", second occurrence, should be -- or --.

In column 8, line 62, "mechanisms" should be -- mechanism --.

In column 9, line 15, after "centered", insert -- relative --.

In claim 8, column 11, line 33, "connecting" should be -- connection --.

In claim 9, column 11, line 50, "beams," should be -- beams; --.

In claim 14, column 13, line 54, "part" should be -- apart --.

In claim 14, column 13, line 57, before the paragraph beginning "a plurality", insert the following paragraph:

-- a plurality of transverse drive beams, one for each set of floor slat members, each transverse drive beam including means for connecting it to its set of floor slat members; --

In claim 14, column 13, line 65, "member" should be -- members --.

In claim 19, column 15, line 61, "memebers" should be -- members --.

UNITED STATES PATENT AND TRADEMARK OFFICE

CERTIFICATE OF CORRECTION

PATENT NO: Re. 35,022

DATED: August 22, 1995

INVENTOR(S): Raymond Keith Foster

It is certified that error appears in the above-identified patent and that said Letters Patent are hereby corrected as shown below:

In claim 19, column 15, line 63, there is a comma after "19".

In claim 29, column 17, line 59, "portion" should be -- portions --.

In claim 33, column 19, line 27, "said space" should be -- the space --.

In claim 34, column 20, line 35, "connecting" should be -- connection --.

Signed and Sealed this

Twenty-fifth Day of June, 1996

*Attest:*

*Attesting Officer*

BRUCE LEHMAN

*Commissioner of Patents and Trademarks*

UNITED STATES PATENT AND TRADEMARK OFFICE

CERTIFICATE OF CORRECTION

PATENT NO: Re. 35,022

DATED: August 22, 1995

INVENTOR(S): Raymond Keith Foster

It is certified that error appears in the above-identified patent and that said Letters Patent is hereby corrected as shown below:

Claim 33, column 19, line 1, after "defining", insert -- variable --.

Signed and Sealed this

Twentieth Day of January, 1998

*Attest:*

*Attesting Officer*

BRUCE LEHMAN

*Commissioner of Patents and Trademarks*